(12) United States Patent
Urban

(10) Patent No.: US 8,211,304 B1
(45) Date of Patent: Jul. 3, 2012

(54) COOLANT FILTRATION SYSTEM AND METHOD FOR METAL WORKING MACHINES

(75) Inventor: Keith Alan Urban, Sylvan Lake, MI (US)

(73) Assignee: JK Industries, LLC, Warren, MI (US)

( * ) Notice: Subject to any disclaimer, the term of this patent is extended or adjusted under 35 U.S.C. 154(b) by 1117 days.

(21) Appl. No.: 12/013,809

(22) Filed: Jan. 14, 2008

Related U.S. Application Data

(60) Provisional application No. 60/884,877, filed on Jan. 13, 2007.

(51) Int. Cl.
B01D 21/26 (2006.01)
B01D 33/06 (2006.01)

(52) U.S. Cl. ..... 210/295; 210/297; 210/298; 210/360.1; 210/380.1; 210/402; 210/416.1; 210/806

(58) Field of Classification Search ........... 210/295, 210/297, 298, 360.1, 380.1, 402, 416.1, 806
See application file for complete search history.

(56) References Cited

U.S. PATENT DOCUMENTS

| | | | |
|---|---|---|---|
| 3,455,457 A | 7/1969 | Popelar | |
| 3,498,461 A | 3/1970 | Miller | |
| 3,599,795 A | 8/1971 | Worlidge | |
| 3,717,255 A | 2/1973 | Rowland et al. | |
| 4,715,964 A | 12/1987 | Harms | |
| 5,158,677 A | 10/1992 | Hewitt et al. | |
| 5,167,839 A | 12/1992 | Widmer, II et al. | |
| 6,015,487 A | 1/2000 | Mori | |
| 6,066,255 A | 5/2000 | Anderson | |
| 6,162,355 A | 12/2000 | Mizuno et al. | |
| 6,355,167 B1 | 3/2002 | Wensauer | |
| 6,571,959 B1 | 6/2003 | Moore et al. | |
| 6,572,779 B2 * | 6/2003 | Nemedi et al. | 210/806 |
| 6,705,555 B1 | 3/2004 | Bratten | |
| 7,014,760 B2 | 3/2006 | Ackermanns et al. | |
| 7,014,764 B2 | 3/2006 | Ackermanns et al. | |
| 7,115,200 B2 | 10/2006 | Ackermanns et al. | |
| 2003/0015482 A1 | 1/2003 | Bremer | |
| 2007/0051672 A1 | 3/2007 | Reynders et al. | |
| 2007/0295649 A1 | 12/2007 | Reynders et al. | |

FOREIGN PATENT DOCUMENTS

| | | |
|---|---|---|
| DE | 19836728 A1 | 2/2000 |
| DE | 202006009150 U1 | 8/2006 |
| EP | 0432379 A2 | 6/1991 |
| EP | 1498167 A1 | 1/2005 |
| GB | 628549 | 4/1946 |
| GB | 2124510 A | 2/1984 |

(Continued)

*Primary Examiner* — David A Reifsnyder
(74) *Attorney, Agent, or Firm* — Gifford, Krass, Sprinkle, Anderson & Citkowski, P.C.

(57) ABSTRACT

A coolant filtration system and method for use with one or more metal working machines. The system includes a housing, pump, conveyer assembly, drum assembly, and centrifugal separator. The housing includes a tank that receives and holds coolant coming out of the one or more metal working machines. The pump is used to drive the coolant through the coolant filtration system. A part of the conveyer assembly is disposed within the housing in order to carry-away workpiece chips from the coolant. The drum assembly is located near the conveyer assembly in order to filter the coolant. The centrifugal separator receives coolant processed by the conveyor and drum assemblies. The system can further include one or more fine filters for additional filtering of the coolant outputted by the centrifugal separator.

11 Claims, 1 Drawing Sheet

FOREIGN PATENT DOCUMENTS

| | | |
|---|---|---|
| GB | 2340768 A | 3/2000 |
| JP | 3213269 | 9/1991 |
| JP | 9075620 | 3/1997 |
| JP | 9201502 | 8/1997 |
| JP | 9309043 | 12/1997 |
| JP | 2002113634 | 4/2002 |
| JP | 2003311106 | 11/2003 |
| JP | 2004074358 | 3/2004 |
| JP | 2005014179 | 1/2005 |
| JP | 2005349507 | 12/2005 |
| JP | 2006159393 | 6/2006 |
| WO | 03070425 A1 | 8/2003 |

* cited by examiner

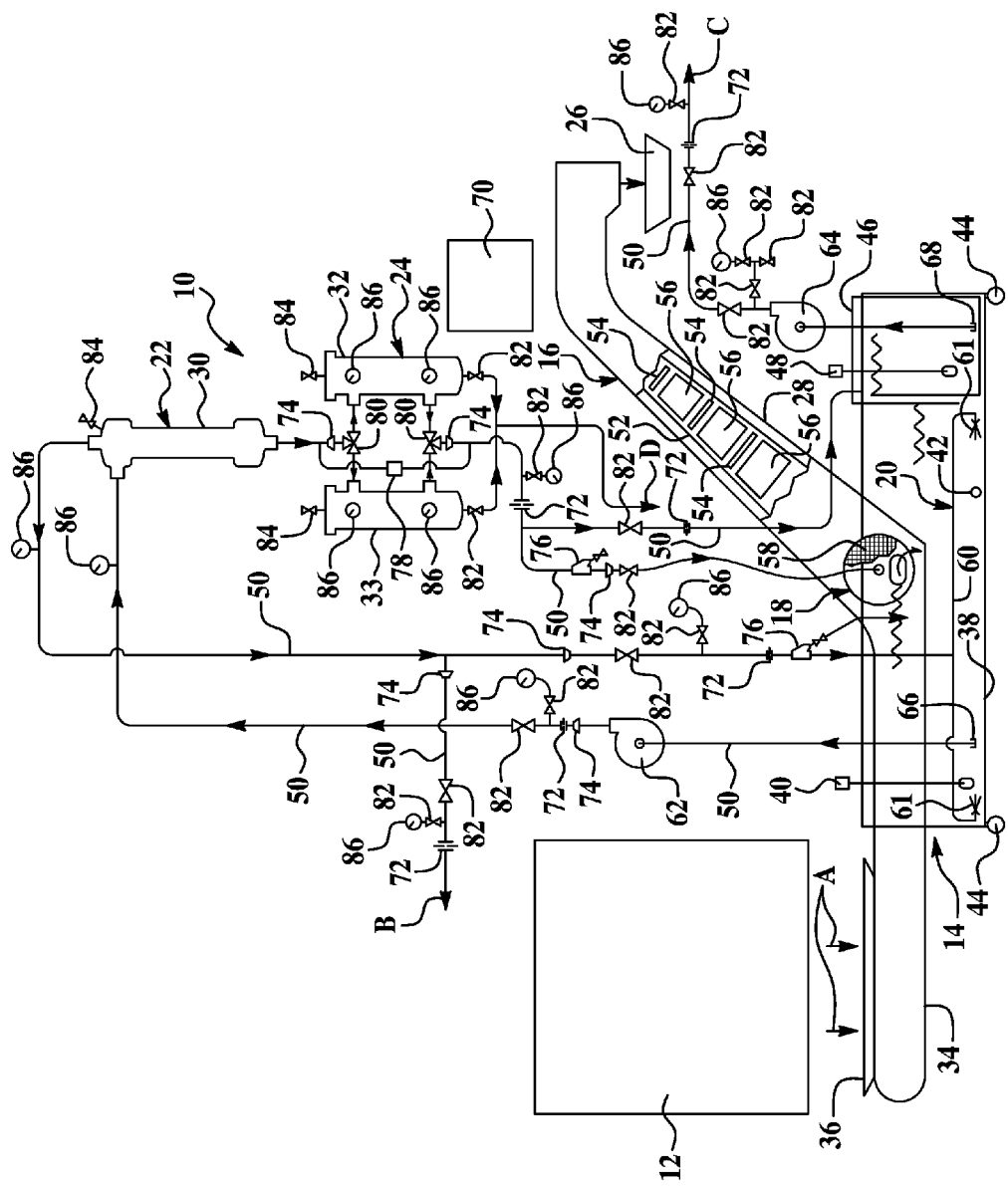

COOLANT FILTRATION SYSTEM AND METHOD FOR METAL WORKING MACHINES

CROSS-REFERENCE TO RELATED APPLICATION

This application claims the priority of U.S. Application No. 60/884,877, filed Jan. 13, 2007, the complete disclosure of which is hereby incorporated by reference.

TECHNICAL FIELD

This invention relates to metal working machines and more particularly to coolant filtration systems used with metal working machines.

BACKGROUND OF THE INVENTION

Metal working machines commonly use coolant to, among other things, cool the metal working workpiece, lubricate the machine tool, and wash away workpiece chips on the machine itself. Over time the coolant can become contaminated from workpiece chips, sludge, and other matter that makes the coolant less effective and shortens its useful life.

SUMMARY OF THE INVENTION

One aspect of the invention is directed to a coolant filtration system that can be used with one or more metal working machines. The coolant filtration system can include a housing, a pump, a conveyer assembly, a drum assembly, and a centrifugal separator. The housing can include a tank that can receive and hold coolant coming out of the one or more metal working machines. The pump drives the coolant through the coolant filtration system, and the conveyer assembly carries-away workpiece chips from the coolant. The drum assembly filters the coolant which is then pumped to the centrifugal separator for further removal of matter from the coolant.

Another aspect of the invention provides a method of filtering coolant in one or more metal working machines. The method includes depositing coolant from the one or more metal working machines into a tank. The method also includes carrying away workpiece chips from of the coolant that is in the tank as well as filtering the coolant that is in the tank. Coolant is pumped out of the tank and the method then involves separating matter from the coolant which can be done using, for example, a centrifugal separator. Finally, the method includes feeding the coolant to the one or more metal working machines.

Another aspect of the invention may include a coolant filtration system that can be used with a metal working machine. The coolant filtration system can include first, second, and third tanks, a first pump, a second pump, a conveyer assembly, a drum assembly, a sweeper assembly, a centrifugal separator, a fine filter, a first supply, and a second supply. The conveyer assembly can carry-away workpiece chips from the coolant and the drum assembly can filter the coolant which can then be discharged into the second tank. The sweeper assembly agitates the coolant in the second tank, which can pumped from the second tank to the centrifugal separator. The fine filter can filter the coolant outputted from the centrifugal separator. The first and second supplies can feed coolant to the metal working machine, one for use in washing away workpiece chips and the other to cool the workpiece.

BRIEF DESCRIPTION OF THE DRAWINGS

Preferred exemplary embodiments of the invention will hereinafter be described in conjunction with the appended FIGURE which is a schematic representing a coolant filtration system of this invention.

DETAILED DESCRIPTION OF THE PREFERRED EMBODIMENTS

Referring now to the FIGURE, it shows an embodiment of a coolant filtration method and system 10 that can be installed on one or more metal working machines 12 to filter a coolant used with those machines. The system can be retrofitted on an existing metal working machine, or installed as part of the original equipment of the machine. When activated, the coolant filtration system 10 continuously circulates and filters coolant coming from the metal working machine 12, and then feeds the filtered coolant back to the machine. In this way, the system 10 provides more effective coolant and a longer coolant life as compared to coolant that is not filtered at all, and as compared to coolant that is not filtered in the same way as that furnished by the system 10. A machine frame or housing 14 accommodates a number of filtration stages that may include a conveyor assembly 16 to take-away workpiece chips from the coolant, a drum assembly 18 to filter coarse fines from the coolant, a sweeper assembly 20 to keep the coolant and other matter moving in the housing 14, a centrifugal separator 22 to separate matter from the coolant, and a fine filter 24 to filter the smaller fines from the coolant. In some cases, the coolant may be subjected to only some of the above stages or may be subjected to the stages in different orders, and in other cases, the coolant is subjected to all of the stages in sequence, in parallel, or in some combination of both. The coolant filtration system 10 may also include various system components to provide and control coolant-flow in the system.

The metal working machines 12 that may use the coolant filtration system 10 can be any one of numerous machines that use coolant including a CNC machine, a broaching machine, a honing machine, a grinding machine, or the like. As mentioned, a single coolant filtration system 10 can be installed on a single machine 12 or on a plurality of machines 12. The metal working machines 12 can be fitted to the coolant filtration system 10 so that the coolant from the machine is deposited into the housing 14 as shown by arrows A. A chip receptacle 26 may be provided as part of the machines 12, or with the system 10, to catch workpiece chips deposited from the conveyor assembly 16.

The housing 14 may be constructed to house and support the various filtration stage components and the system components. The housing 14 may also define the fluid-flow path throughout the coolant filtration system 10. The housing 14 can be made out of steel with fluid-tight seals installed throughout. Each filtration stage component may have its own subhousing; for instance, the conveyor assembly 16 may have a conveyor housing 28, the centrifugal separator 22 may have a separator housing 30, and the fine filter 24 may have a pair of vessels 32, 33. These subhousings can be part of the housing 14, or can be separate components installed to the housing such as the separator housing 30 and the vessels 32, 33 being combined as a module. The housing 14 may also include a first tank 34 with a chute 36 for receiving the coolant from the metal working machines 12. A second, or coolant, tank 38 may be provided downstream the first tank 34 for holding the coolant coming from the first tank and other places. The coolant tank 38 can have a capacity of about 545 liters (144 gallons), although it will be appreciated that much smaller or much larger (e.g., 1000 gal) tanks could be used depending upon the application. A level sensor 40 may be installed in the coolant tank 38 and calibrated to trigger when the coolant level is low in the coolant tank. A normally plugged drain 42 and a plurality of casters 44 may also be provided on the coolant tank 38.

A third tank 46 may be located adjacent the coolant tank 38 as a final holding tank for the coolant exiting the fine filter 24 before that coolant is fed back to the metal working machines 12. The third tank 46 can have a level sensor 48 that, like the level sensor 40, would determine when the coolant level is low and thus indicate a possible leak or other malfunction. Numerous pipes or other conduits 50 may communicate and connect the different filtration stage components and the system components, and may lead to a first supply shown by an arrow B and a second supply shown by an arrow C. The first supply B feeds the coolant to the metal working machines 12 at a rate of about 95 LPM (25 GPM) for washing away workpiece chips; this coolant does not flow through the centrifugal separator 22 or the fine filter 24. And the second supply C feeds the coolant at a rate of 30 LPM (8 GPM) for cooling the particular workpiece and for lubricating the particular machine tool. These flow rates to the machines 12 will vary by application and are typically determined by the metal working machine manufacturer.

The conveyor assembly 16 may be used as one filtration stage to carry-away, or otherwise filter, workpiece chips from the coolant and put the chips in the chip receptacle 26. In other words, this stage initially removes the larger matter present in the coolant such as long and stringy pieces of metal. In this sense, the conveyor assembly 16 may constitute the first stage in the coolant filtration system 10. The conveyor housing 28 may be mounted directly to the first tank 34, with a section disposed in the first tank 34, in the coolant tank 38, or both. The conveyor assembly 16 may be arranged downstream the deposited coolant A to trap the deposited chips before the chips reach the coolant tank 38. In different embodiments, the conveyor assembly 16 can be of the known hinge belt type conveyor, drag type conveyor, magnetic type conveyor, or a combination thereof. The conveyor assembly 16 may include an endless conveyor belt 52 that continuously moves at about 5 to 9 FPM when the system is activated. In one example, the conveyor belt 52 may be about 380 mm (15 inches) wide and may carry a plurality of staggered blades 54 to drag along a section of the bottom of the first tank 34 in order to scoop up the larger workpiece chips settled thereon. Smaller workpiece chips can be attracted to a plurality of magnetic plates 56 that may be attached to the conveyor assembly adjacent the conveyor belt 52.

The drum assembly 18 may be used as another filtration stage to filter smaller matter out of the coolant as compared to the first stage, and may function downstream of the conveyor assembly 16. In this sense, the drum assembly may constitute the second stage in the coolant filtration system 10. In some embodiments, the drum assembly 18 can be an integrated part of, or combined with, the conveyor assembly 16. That is, the drum assembly 18 can be functionally associated with the conveyor assembly 16 such that the drum assembly is connected to and driven by the conveyor belt 52. The drum assembly 18 may be mounted near the bottom of the conveyor housing 28 and at one end of the first tank 34, so that coolant flows through, and is filtered by, the drum assembly before the coolant flows into the coolant tank 38. The drum assembly 18 may be composed of a metal frame or skeleton with a filter skin 58 stretched therearound. The skin 58 may be composed of one of various materials to produce about an 80 micron filter, such as a nylon material or a stainless steel mesh. In other embodiments, the drum assembly 18 may be mounted as a separate component away from the conveyor assembly 16 to be powered and driven by its own motor assembly.

The sweeper assembly 20 keeps the coolant and other matter constantly moving, or agitated, in the coolant tank 38 so that the coolant and other matter cannot settle and build-up on the bottom of the coolant tank, and instead is directed toward other system components for further filtering. The sweeper assembly 20 may constitute the third stage in the coolant filtration system 10. As shown, the sweeper assembly 20 may be located in the coolant tank 38. A pipe or conduit 60 is threaded with a pair of eductors 61 on each of its ends and positioned on opposite sides of the coolant tank 38 about 2-5 inches vertically above the bottom of the tank. The eductors 61 receive coolant at a pressure of about 15 p.s.i. and eject that coolant in a targeted ratio of 4:1 in terms of volume increase. The exact pressure may vary from application-to-application, and may depend on, among other thing, the volume of the coolant tank 38 and the viscosity of the particular coolant. If the jet stream pressure is too high, the coolant may experience turbulent flow which would cause smaller matter to settle; and conversely, if the jet stream pressure is too low, larger matter would settle. Suitable eductors may be supplied by BEX Inc. of Livonia, Mich., U.S.A. (www.bex.com).

The centrifugal separator 22 may be used as yet another filtration stage to separate matter, such as sludge, from the coolant. This stage may be downstream, or come after, the third stage, and thus may constitute the fourth stage in the coolant filtration system 10. Suitable centrifugal separators will remove matter greater than about 60 micron in size with a specific gravity higher than 1.8 out of the coolant, and are rated for pressures to about 150 PSID and for temperatures up to about 200° F. Such separators can be supplied by PUROFLUX Corporation (www.puroflux.com).

The fine filter 24 may be used as yet another filtration stage to filter the coolant. This stage may be downstream the fourth stage, and thus may constitute the fifth stage in the coolant filtration system 10. Suitable fine filter cartridges remove matter greater than about 10 to 30 micron in size and may include the melt blown polypropylene type, the polyester felt type, the cellulose type, the nomex type, the spunbond polyester and nylon type, the nylon mesh type, the stainless steel mesh type, or the like. Some of these types can be supplied by American Filtration Technologies, Inc. of Henrietta, N.Y., U.S.A. (www.aftechnologies.com). The fine filter 24 is held in the vessels 32 during filtration.

Other system components of the coolant filtration system 10 may include a first pump 62 that drives the coolant from the coolant tank 38 to the rest of the system, and a second pump 64 that drives the coolant from the third tank 46 and to the metal working machine 12 through the second supply C. Depending on the application, suitable pumps may be of the vertical immersion type like those supplied by Brinkmann Pumps Inc. of Wixom, Mich., U.S.A. (www.brinkmann-pumpen.de)—the TA style pump may be suitable for the first pump 62, and the TC style pump may be suitable for the second pump 64. In this example, the first pump 62 is rated for 105 GPM at 38 psi with a 3,450 RPM motor, and the second pump 64 is rated for 8 GPM at 245 psi with a 3,450 RPM motor. Again, these flow rates, as well as the various flow rates through different parts of the system, may vary from application-to-application. The first pump 62 produces enough pumping force to provide fluid-flow throughout the coolant filtration system 10. In other words, the coolant can maintain flow as it travels through the system without additional help. The first pump's inlet is piped to an inlet 66 in the coolant tank 38, and the first pump's outlet is piped to the centrifugal separator 22. The second pump's inlet is piped to an inlet 68 in the third tank 46, while the second pump's outlet is piped to the second supply C.

A control panel assembly 70 may be provided to serve as the control center for the coolant filtration system 10 and provide automation to the system. The control panel assembly 70 may communicate with the coolant filtration system 10 by reading inputs from the system including, for example, the level sensors 40 and 48. Also, the control panel assembly 70 may send outputs to control various system components including, for example, energizing and deenergizing the first and second pumps 62 and 64. A human-machine-interface (HMI) may also be provided to interact with a machine operator by allowing everyday controls, giving the status of various components of the coolant filtration system, reporting alarms, and the like.

Numerous orifices 72 may be installed in the coolant filtration system 10 to restrict fluid-flow at the particular location that one is installed at. The orifices slow the rate of fluid-flow to keep the system operating efficiently. For example, without flow restriction, the first pump 62 could pump fluid through the centrifugal separator 22 and the fine filter 24 at a high rate, which in turn could reduce the fluid-flow in the coolant tank 38 and thus cause fines and other matter to settle in the coolant tank 38. Suitable orifices can be of the union type, the dilating type, or the like. Although the example orifices 72 shown are unions having orifice plates, unions without orifice plates can be used where appropriate for the desired flow restriction, and other non-union type flow restrictors can be used in addition to, or in lieu of, the unions. As shown, one orifice 72 (⅛" inch dia.) can be installed in the pipes 50 downstream the first pump 62, immediately downstream the fine filter 24, and another one (1 inch dia. with 7/16 inch dia. bore) further downstream the fine filter 24 and upstream the third tank 46. One orifice 72 (¾ inch dia. with 3/16 inch dia. bore) can be installed in the pipes 50 downstream the second pump 64 and upstream the second supply C. Still another orifice 72 (1 inch dia. with ½ inch dia. bore) can be installed in the pipes 50 downstream the centrifugal separator 22 and upstream the first supply B. Of course, the exact number and location of orifices will vary from application-to-application, and may depend on, among other things, the desired fluid-flow rate, and the viscosity of the particular coolant.

Numerous pipe reducers 74 may be installed in the coolant filtration system 10 to reduce the diameter at the particular location of the pipe. As shown, one pipe reducer 74 may be installed downstream the first pump 62 to reduce the pipe diameter from 2½ inches to 2 inches. Other pipe reducers may be used in the system to keep the fluid velocity consistent when the flow is split into different paths by reducing the cross-sectional area of the pipe after the split to keep the velocity similar to that of the larger pipes with higher flows. For example, one such pipe reducer 74 may be installed downstream the centrifugal separator 22 and upstream the first supply B to reduce the pipe diameter from 2 inches to 1 inch, and yet another pipe reducer 74 may be installed downstream the centrifugal separator 22 and upstream the sweeper assembly 20 to reduce the pipe diameter from 2 inches to 1½ inches. Pipe reducers 74 may also be installed on opposite sides of the fine filter 24, and another one downstream the fine filter 24 to reduce the pipe diameter going to the drum assembly 18 from 1 inch to ¾ inch. Of course, the exact number and location of the pipe reducers will vary from application-to-application, and may depend on, among other things, the desired fluid-flow rate and the viscosity of the particular coolant.

Furthermore, a pair of Y-strainers 76 may be installed in the coolant filtration system 10 to remove matter in the fluid-flow to thus protect downstream system components. As shown, one Y-strainer 76 may be installed downstream the fine filter 24 and upstream the drum assembly 18, and another one may be installed downstream the centrifugal separator 22 and upstream the sweeper assembly 20. A single differential pressure switch 78 may be installed at the fine filter 24 to use the differential pressures at inlet and outlet of the fine filter to indicate when the filter is dirty and needs replacement. Also, a three-way valve 80 may be installed adjacent both the inlet and outlet of the fine filter 24 to regulate fluid-flow between the piping and the vessels 32, 33. Numerous ball valves 82 may also be installed in the coolant filtration system 10 that open and close to respectively allow and prevent fluid-flow. Suitable ball valves can be of the full port type like the Apollo brand valves supplied by Conbraco Industries Inc. of Matthews, N.C. U.S.A. (www.conbraco.com). Lastly, vents 84 may be installed on the centrifugal separator 22 and the fine filter 24 to selectively allow pressure discharge on each, and numerous pressure gages 86 may be installed in the coolant filtration system 10 to measure the pressure at their respective locations.

When installed and activated, the coolant filtration system 10 continuously circulates the machine coolant through at least some of the filtration stages to filter the coolant, and then eventually routes the coolant back to the metal working machines 12 either through the first supply B or the second supply C. The fluid-flow begins at the chute 36 which receives the deposited coolant and other matter A into the first tank 34. The larger workpiece chips are then carried away by the conveyor assembly 16 and even smaller matter—about 80 micron in size—is filtered by the drum assembly 18 before the coolant enters the coolant tank 38. Once in the coolant tank 38, the fluid-flow is kept agitated or otherwise moving by the sweeper assembly 20. In particular, the eductors 61 direct the coolant and other matter toward the inlet 66 by its jet stream. The coolant thus enters the pipes 50 (and/or pump suction directly if pump is of vertical immersion type) and is pumped by the first pump 62 to the centrifugal separator 22 where the coolant is directed into the separator for separation, some of which is then fed back to the sweeper assembly 20 before entering the separator to provide the jet stream and thus facilitate the sweeper functionality. Also, some of the coolant fed to the sweeper assembly 20 is again directed toward the first supply B to be used by the metal working machines 12.

The solids that are concentrated by the centrifugal separator 22 then move with the fluid-flow from the bottom of the separator and to the fine filter 24 for further filtering. The coolant then comes out of the fine filter at the lower outlet three-way valve 80 to either the third tank 46 or back to the drum assembly 18. At the third tank, the second pump 64 pumps the coolant to the second supply C to be used by the metal working machines 12; and at the drum assembly 18, the coolant feeds cleaning nozzles located on a spray bar and is directed at the rotating drum media. And some of the coolant (typically during filter changes) comes out of the fine filter 24 at the two outlet ball valves 82 where the coolant can flow to a drain or back to the coolant tank 38 as shown by an arrow D.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A coolant filtration system for use with one or more metal working machines, the coolant filtration system comprising:
   a housing including at least one tank that receives and holds coolant of the one or more metal working machines;
   at least one pump that drives the coolant through the coolant filtration system;
   a conveyer assembly disposed at least partly within said housing to carry-away workpiece chips from the coolant;
   a drum assembly located adjacent said conveyer assembly to filter the coolant; and
   a centrifugal separator connected within the system such that it receives coolant pumped through the system that has been filtered by said conveyor assembly and said drum assembly.

2. A coolant filtration system as defined in claim 1, further comprising a sweeper assembly located within said at least one tank, wherein said sweeper assembly constantly moves the coolant and other matter in said at least one tank.

3. A coolant filtration system as defined in claim 2, wherein said sweeper assembly includes a pair of eductors that are oppositely disposed within said at least one tank and that produce a jet stream of coolant within said at least one tank prior to the coolant being pumped to said centrifugal separator.

4. A coolant filtration system as defined in claim 1, further comprising a fine filter communicating with said centrifugal separator to filter the coolant outputted by said centrifugal separator.

5. A coolant filtration system as defined in claim 1, wherein said at least one tank includes a first tank that initially receives the coolant from the one or more metal working machines, a second tank that holds the coolant downstream said first tank, and a third tank that holds coolant downstream said centrifugal separator.

6. A coolant filtration system as defined in claim 1, wherein said at least one pump includes a first pump that drives the coolant from said at least one tank and to said centrifugal separator, and a second pump that drives the coolant from said at least one tank and to the one or more metal working machines.

7. A coolant filtration system as defined in claim 1, further comprising a first supply that feeds coolant to the one or more metal working machines before the coolant enters said centrifugal separator, and a second supply that feeds coolant to the one or more metal working machines.

8. A coolant filtration system as defined in claim 1, further comprising a control panel assembly to automate the coolant filtration system.

9. A coolant filtration system as defined in claim 1, further comprising at least one orifice to restrict flow of the coolant, said at least one orifice being located downstream of said at least one pump and upstream of said centrifugal separator.

10. A coolant filtration system for use with a metal working machine, the coolant filtration system comprising:
    first, second, and third tanks;
    a first pump that drives coolant out of said second tank;
    a second pump that drives coolant out of said third tank;
    a conveyer assembly in communication with said first tank and operable to carry-away workpiece chips from the coolant contained in said first tank;
    a drum assembly located adjacent said conveyer assembly to filter the coolant prior to discharge of the coolant into said second tank;
    a sweeper assembly located within said second tank to agitate the coolant in said second tank;
    a centrifugal separator that receives coolant pumped from said second tank;
    a fine filter that receives coolant outputted from said centrifugal separator;
    a first supply that feeds coolant to the metal working machine to wash-away workpiece chips; and
    a second supply that feeds coolant to the metal working machine to cool the workpiece.

11. A coolant filtration system as defined in claim 10 wherein coolant fluid-flow begins in said first tank, the coolant is then subjected to the conveyer assembly and the drum assembly, the coolant is then driven to the centrifugal separator by the first pump, and at least some of the coolant is then subjected to the fine filter and added into the third tank.

* * * * *